G. H. STRODE.
SWITCH LOCK.
APPLICATION FILED MAR. 28, 1916.

1,206,611.

Patented Nov. 28, 1916.
2 SHEETS—SHEET 1.

Inventor
George H. Strode
By Victor J. Evans
Attorney

Witnesses

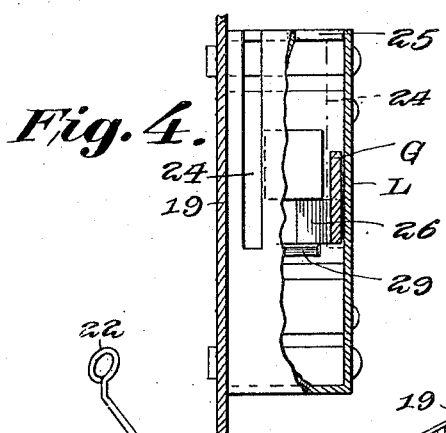
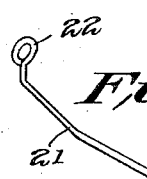
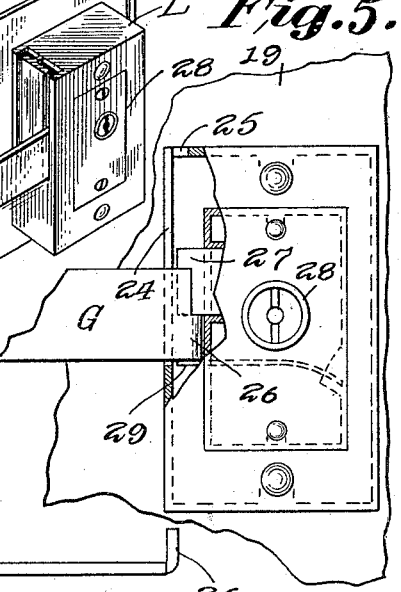
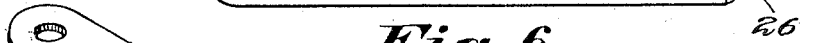
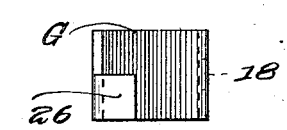

UNITED STATES PATENT OFFICE.

GEORGE H. STRODE, OF COLUMBUS, OHIO.

SWITCH-LOCK.

1,206,611.　　　　　Specification of Letters Patent.　　Patented Nov. 28, 1916.

Application filed March 28, 1916.　Serial No. 87,270.

*To all whom it may concern:*

Be it known that I, GEORGE H. STRODE, a citizen of the United States, residing at Columbus, in the county of Franklin and State of Ohio, have invented new and useful Improvements in Switch-Locks, of which the following is a specification.

This invention relates to switch locks for automobiles, motor vehicles and the like, and it has for its object to produce a simple and effective device for preventing the switch from being tampered with by unauthorized persons.

A further object of the invention is to produce a lock supporting base which may be readily mounted on the dash board of certain automobiles, particularly the "Ford" type of automobiles by the same fastening means that are employed for mounting the coil box in position on the dash board, said supporting base being utilized for supporting a lock case and also a bar or keeper which may be engaged with the lock and which may be thereby maintained in obstructing position with respect to the keyhole of the switch box.

With these and other ends in view which will readily appear as the nature of the invention is better understood, the same consists in the improved construction and novel arrangement and combination of parts which will be hereinafter fully described and particularly pointed out in the claims.

In the accompanying drawings has been illustrated a simple and preferred form of the invention, it being, however, understood that no limitation is necessarily made to the precise structural details therein exhibited, but that changes, alterations and modifications within the scope of the claims may be resorted to when desired.

Figure 1:
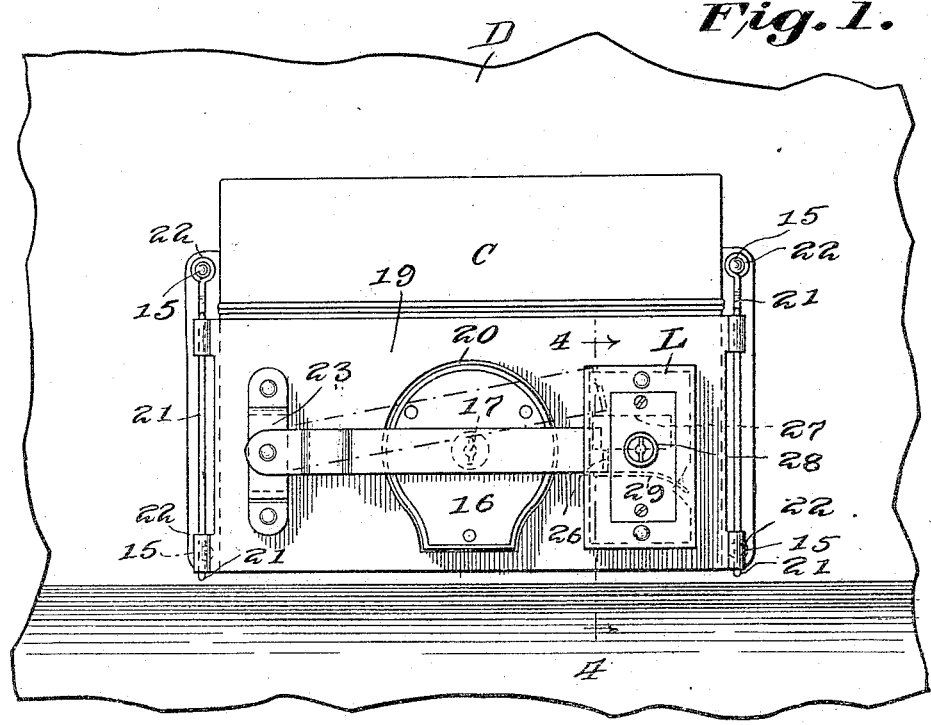
Figure 2:
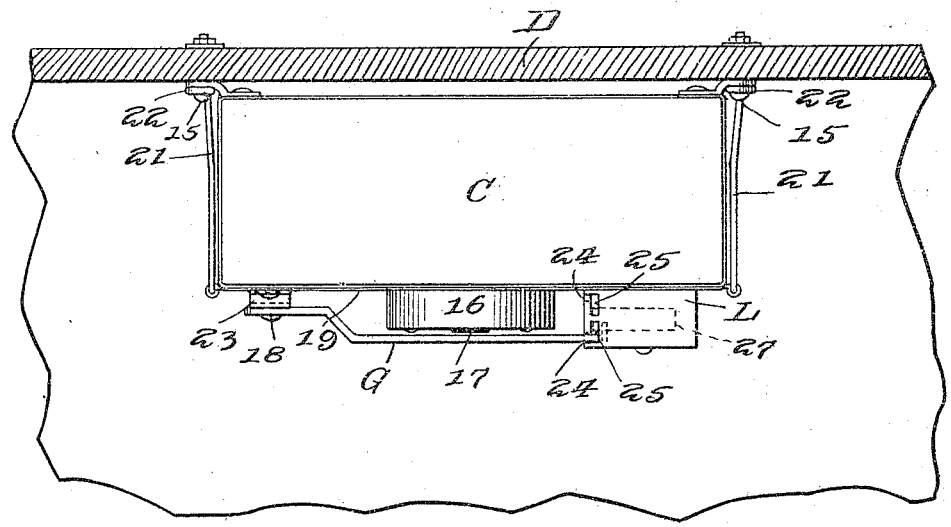

In the drawings,—Figure 1 is a view in elevation showing the coil box and a portion of the dash board of a "Ford" automobile to which the invention has been applied. Fig. 2 is a top plan view of the same. Fig. 3 is a perspective view of the supporting base having the guard or keeper and the lock casing. Fig. 4 is a sectional detail view taken on the line 4—4 in Fig. 1. Fig. 5 is a face view of the lock casing with parts broken away. Fig. 6 is a top plan view of the guard member or keeper. Fig. 7 is an end view of the guard member or keeper. Fig. 8 is a perspective view showing the guard member or keeper of a modified construction.

Corresponding parts in the several figures are denoted by like characters of reference.

The coil box of an ordinary "Ford" automobile is indicated at C, said coil box being mounted securely on the dash board D by fastening members, such as bolts 15. The coil box has the customary raised switch casing 16 which is provided with a keyhole 17 for the admission of the ordinary switch key. These switch keys are interchangeable, as is well known, and anyone possessing a switch key may be said to have access to the coil box of any automobile of the type for which the switch key is provided.

By my present invention I provide a guard member or keeper consisting of a bar G which is pivotally supported at 18 adjacent to one side of the switch casing, the free end of the said keeper being adapted to engage and to be secured by a lock contained in a casing L adjacent to the opposite side of the switch casing so that the bar, when thus engaged and secured, will extend across the keyhole 17 and prevent access thereto.

For the convenient mounting of the guard or keeper G and the lock casing L, I provide a supporting base consisting of a rectangular piece of material, preferably strong sheet metal 19, said base being of a length corresponding to the length of the coil box, and said base having an opening or slot 20 for the passage of a switch casing 16. The base 19 is provided at the ends thereof with limbs 21 hingedly connected therewith, and said limbs having terminal eyes 22 for the passage of the bolts or fastening members 15 which also serve to secure the coil box C on the dash board D. Riveted or otherwise secured on the base 19 at one side of the opening 20 is a strap 23 with which the keeper or guard member G is connected by the pivot member 18. Riveted or otherwise secured on the base 19 adjacent to the opposite side of the opening 20 is the lock casing L, which latter, together with the guard member, may thus be applied in position for operation by simply mounting the supporting base on the coil box by means of the fastening members 15, whereby said coil box is secured on the dash board.

The lock casing is provided in the side wall thereof nearest the opening 20 with slots 24 communicating at their upper ends with lateral slots 25 in the top of the lock casing, said slots being for the admission of the free end of the keeper or guard member. The latter is provided at its free end with a laterally extending lug 26 which, when inserted within the lock casing, is adapted to be secured by means of a bolt 27, the latter being actuated by means of a special key, not shown, the lock, however, being of the type having a barrel 28 for engagement with the key. When the bolt is retracted the end of the keeper or guard member having the lug 26 may be freely inserted within the lock casing where, when the bolt is projected, it is held securely in position, it being obvious that the parts are to be so proportioned that when the guard member is secured, it will extend across the keyhole 17 of the switch casing. The lock casing L contains a spring 29 which is adapted to be tensioned by the free end of the keeper when the latter is inserted in the lock casing; said spring will serve, when the bolt 27 is retracted, to project the free end of the keeper from the lock casing.

When the device is used in connection with the coil box of a "Ford" machine the keeper or guard member is provided with an offset 30 of a height equal to the height of the switch casing 16, and the lug 26 is made to project rearwardly from the guard member, which latter will thus be adapted to engage the slots 24, 25 adjacent to the front wall of the lock casing. When the invention is used in connection with a coil box having a flat switch casing or in which the switch casing does not project beyond the face of the coil box, a guard member G' is used consisting of a flat strip of material having at its free end a forwardly extending lug 26', such guard member and lug being adapted for engagement with the rearward slots in the side and top walls.

From the foregoing description, taken in connection with the drawings hereto annexed, it will be seen that I have produced a simple and effective device which may be readily mounted on the dash board of an automobile or motor vehicle for the purpose of affording protection against the switch being tampered with.

It is desired to be understood that while in certain machines, especially those of the "Ford" type, the supporting base 19 constitutes an important element because it enables the protecting device to be mounted in position without drilling holes in the coil box, at the same time it will be possible to omit the base 19 and to secure the strap 23, as well as the lock casing L, directly on the coil box.

Other modifications may obviously be resorted to as may be rendered necessary in order to apply the invention to machines of different types.

Having thus described the invention, what is claimed as new, is:—

1. A switch casing having a keyhole, a guard member mounted pivotally adjacent to one side of the casing and having a laterally extending lug at its free end, a lock casing mounted adjacent to the other side of the switch casing and having slots for the admission of the free end of the guard member, and a bolt in the lock casing adapted to be projected in the path of the lug of the guard member.

2. A switch casing having a keyhole, a guard member mounted pivotally adjacent to one side of the casing and having a laterally extending lug at its free end, a lock casing mounted adjacent to the other side of the switch casing and having slots for the admission of the free end of the guard member, and a bolt in the lock casing adapted to be projected in the path of the lug of the guard member; and a spring within the lock casing adapted to be tensioned by engagement with the free end of the guard member.

3. A coil box, fastening means for securing the same on a dash board, a supporting base having limbs provided with eyes adapted to be engaged by the fastening means, said supporting base having an opening, a switch casing on the coil box adapted to project through the opening of the supporting base, a guard member pivoted adjacent to one side of said opening, and locking means adjacent to the other side of said opening for engagement with the free end of the guard member.

In testimony whereof I affix my signature in presence of two witnesses.

GEORGE H. STRODE.

Witnesses:
E. M. BALDRIDGE,
C. C. STEVENSON.

Copies of this patent may be obtained for five cents each, by addressing the "Commissioner of Patents, Washington, D. C."